NONDESTRUCTIVE READ MAGNETIC MEMORY ARRANGEMENT

Filed Nov. 29, 1968

INVENTORS P. I. BONYHARD
U. F. GIANOLA
J. L. SMITH

BY Herbert M. Shapiro

ATTORNEY

United States Patent Office 3,566,374

Patented Feb. 23, 1971

3,566,374

NONDESTRUCTIVE READ MAGNETIC MEMORY ARRANGEMENT

Peter I. Bonyhard, Newark, Umberto F. Gianola, Florham Park, and James L. Smith, Bedminster, N.J., assignors to Bell Telephone Laboratories, Incorporated, Murray Hill and Berkeley Heights, N.J., a corporation of New York Filed Nov. 29, 1968, Ser. No. 780,126
Int. Cl. G11c *5/02, 11/06*
U.S. Cl. 340—174 7 Claims

ABSTRACT OF THE DISCLOSURE

The outputs achieved in nondestructive read operations of magnetic core memories operated in a differential permeability mode are enhanced by a pulse added to the selection pulse train to drive to relatively high permeability states only those cores in a selected word which are in a partially switched condition. The increased permeability permits enhanced outputs in particular modes of operation.

FIELD OF THE INVENTION

This invention relates to data processing arrangements and more particularly to magnetic core memories operating in a nondestructive read mode.

BACKGROUND OF THE INVENTION

Nondestructive readout of cores in magnetic memories is known to be a preferred mode of operation because it permits faster cycle times, reduced power requirements, and more reliable operation.

One implementation for achieving nondestructive readout requires that selected cores be partially switched to take advantage of the difference in permeability of the core between remanent and partially switched conditions. Unfortunately, the difference in permeabilities of a core in its remanent and partially swtiched states as modified by current pulses applied to exercise other cores in a memory array in conventional operation has been insufficient to enable nondestructive readout modes to be commercially attractive.

An object of this invention is to provide a magnetic core memory operative in improved nondestructive read modes.

BRIEF DESCRIPTION OF THE INVENTION

The invention is based on the realization that a magnetic core can be driven to a partially switched state and that the area of domain walls in the core, when so driven, determines the permeability of the core. The invention is further based on the discovery that a short duration pulse added to a selection pulse train drives selected cores to a partially switched state characterized by a relatively high permeability indicative of large numbers of domain walls, and, in addition, on the realization that modes of operation can be obtained that minimize the disturbance of the flux state of the cores in a memory array by current pulse applied to selectively change the binary states stored in the arry.

In one embodiment of this invention, a plurality of cores is organized in rows and columns. All the cores in a selected row are driven to a first remanent state of low incremental permeability taken to represent a binary zero. Thereafter those cores which are to store binary ones are driver to like partially switched states of large incremental permeability by coincident pulses on row and column drive implementations. Finally, all the cores in the selected row are driven by a pulse tending to drive all the cores to the first remanent state but of an amplitude and duration to avoid actually driving the partially switched cores to that state. In response to later applied interrogate pulses of limited amplitude, the cores in which binary ones are stored exhibit unexpectedly high incremental permeabilities whereas those in which binary zeros are stored remain in the remanent state exhibiting low incremental permeabilities.

DETAILED DESCRIPTION

Figure 1:
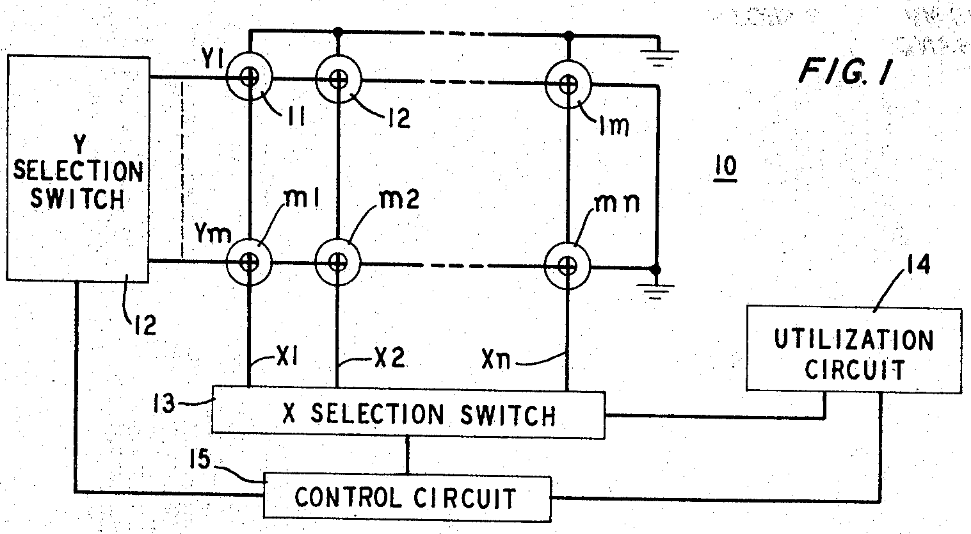
FIG. 1 is a schematic illustration of a magnetic core memory arrangement in accordance with this invention.

FIG. 1 shows a magnetic memory 10 including an array of magnetic cores. The cores are arranged in a conventional array organization accessed by row and column conductors. Each core is designated by row and column and column in which it is positioned. The row conductors are designated Y1 . . . Ym and are connected between a Y selection switch 12 and ground. The column conductors are designated X1 . . . Xn and, similarly, are connected between an X selection switch 13 and ground. The column conductors are connected to a utilization circuit 14 through switch 13. Accordingly, current pulses can be applied selectively to individual column conductors and output signals on selected column conductors can be directed to circuit 14 by judicious control of switch 13. Switches 12 and 13 and circuit 14 are connected to a control circuit 15 for synchronization and control.

The various switches and circuits may be any such elements capable of operating in accordance with this invention.

Figure 2:
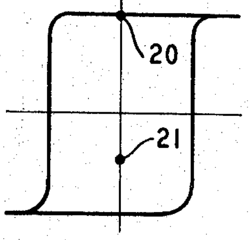
FIG. 2 is a hysteresis loop for a typical magnetic core in the arrangement of FIG. 1.

Each magnetic core in the arrangement of FIG. 1 has a characteristic hysteresis loop ideally of the type shown in FIG. 2. Operation in accordance with this invention illustratively utilizes two operating points on such a curve. One operating point is a first remanent condition of low incremental permeability assumed to be the positive remanent condition identified as 20 in FIG. 2. The other is actually a range of partially switched conditions of high incremental permeability identified as a representative point 21 in FIG. 2. Each selected core in the arrangement of FIG. 1 is driven to one of these two conditions during a selection operation.

During a readout operation, however, it is the difference in permeability between cores in one of these conditions and cores in the other which is detected. It is the enhancement of this difference in permeability and the maintenance thereof against adverse disturbances that may occur as stored information is modified to which this invention is directed.

Figure 3:
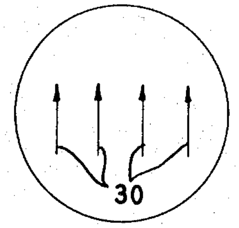
FIGS. 3, 4, and 5 are illustrations of the magnetic conditions in a representative core in the arrangement of FIG. 1 during operation.
Figure 4:
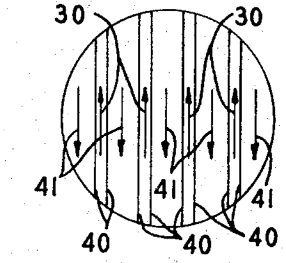
Figure 5:
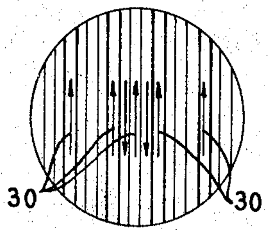

FIGS. 3, 4, and 5 depict, in an idealized form, a representative region of a core in FIG. 1. The region is of arbitrary size and includes many magnetic domains characteristic of such regions in a magnetic material. We will assume first that the region is saturated magnetically in a direction indicated at 20 in FIG. 2. This direction is indicated in FIG. 3 by the upward directed arrows 30 there. All the cores in a selected row of cores in the arrangement of FIG. 1 are first driven to this condition during a selection operation by a pulse on a selected Y conductor only. A state as ideal as that depicted would have very small associated permeability since no domain walls are present. However, in a practical core, local inhomogeneities, particularly in magnetic anisotropy and magnetization, will result in the formation of some domain walls, and therefore in non-ideal low permeability. More importantly, the area of domain wall, and hence the incremental permeability, tends to be increased under disturbances occurring under conventional exercise of a memory array. Such disturbances are minimized under the mode of operation described hereafter.

Partial reversal of the magnetization in selected cores of the selected row is now carried out. This partial reversal is realized by the application of coincident half-select pulses to row and column conductors and results in a magnetic condition depicted schematically in FIG. 4 for each of the cores so driven. The arrows 30 of FIG. 3 are again shown in FIG. 4, but in the latter figure the arrows are shown in areas confined by vertical lines 40. The lines 40 represent domain walls in the representative region of FIG. 3. Arrows 41 also appear in FIG. 4. These arrows represent domains having magnetizations opposite to the original (zero) direction of magnetization. The walls 40 are defined at the boundary between the domains of opposite magnetization.

Each of the cores of a selected row is now in either the remanent or partially switched state shown in FIG. 2. At this juncture, a sharp pulse of properly chosen amplitude and duration is applied to the selected row (Y) conductor to establish a relatively high permeability state in those cores in the row which are in a partially switched state. The application of the pulse is believed to result in the formation of a larger domain wall area, and hence larger incremental permeability, than present in the preceeding partially switched state. This higher permeability state is depicted schematically in FIG. 5 by the larger number of vertical lines present in the representative region shown. The lines represent domain walls arbitrarily shown oriented vertically as viewed. FIGS. 3 to 5 should be regarded as illustrative only since experimental and analytical studies of domain structures lead to the expectation of much more complicated domain configurations.

The pulse for achieving the relatively high permeability state depicted in FIG. 5 is applied along the selected row conductor only and is of the same polarity as the initial pulse applied to that conductor for driving all cores in the row to a first remanent state. But the pulse is of an amplitude and duration insufficient to drive the partially switched cores to that state. The cores in the zero state, of course, remaining undisturbed.

Figure 6:
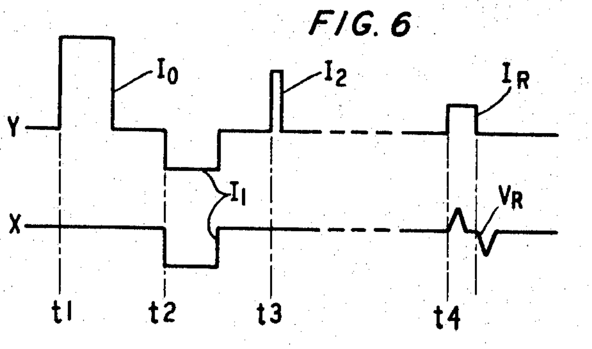
FIG. 6 is a pulse diagram of the operation of the arrangement of FIG. 1.

The pulse diagram showing a selection operation is shown in FIG. 6. The initiating pulse driving all cores in a selected row to first remanent conditions is identified as pulse $I_0$ at time $t1$. The coincident pulses which drive selected cores to partially switched states are shown as pulses $I_1$ at time $t2$. Note that $I_1$ is applied to a particular column (X) conductor at this time only if it is intended to write a binary 1 into the associated core. The additional sharp pulse which drives the partially switched cores to relatively high permeability states is designated $I_2$ and is shown at time $t3$.

Figure 7:
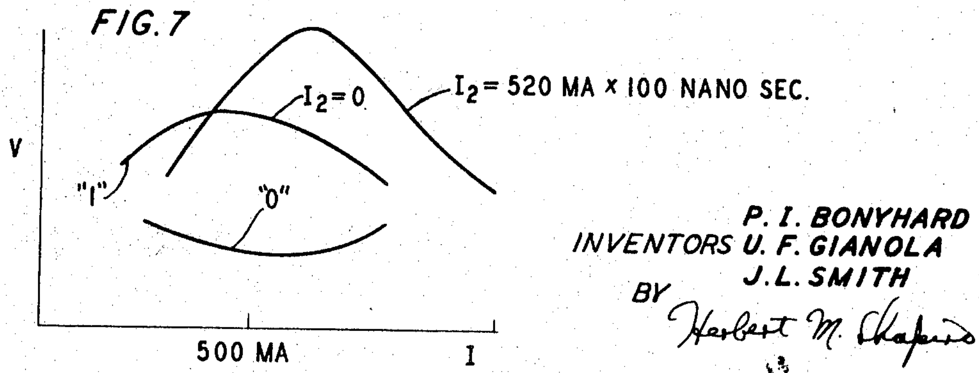
FIG. 7 is a graph showing the output characteristics of the arrangement of FIG. 1 under different operating conditions.

It has been found that a considerable range of amplitudes and durations exists for pulse $I_2$. FIG. 7 shows curves indicating various output voltages for a given interrogate current on a selected row conductor for a stored zero and for a range of amplitudes and durations of the pulse $I_2$. It is clear from the figure that a detectable difference is realized between a "0" and a "1" in the absence of a current $I_2$ (viz, $I_2=0$). But the difference in outputs is increased substantially as indicated by the curve designated $I_2=520$ ma.$\times$100 nano secs. Pulses of up to 500 nano secs duration have been employed to advantage in accordance with this invention. The resulting outputs are indicated at time $t4$ in FIG. 6 by the pulses designated $V_R$ there in response to an interrogate pulse $I_R$. Cores in saturation conditions were affected by the pulse $I_2$ only negligibly.

The operation described is consistent with a two-dimensional (2D) or linear select memory organization. However, in contrast to conventional 2D modes of operation, a substantial reduction of drivers is possible if, after all cores in a selected row are driven to a (binary 0) state, the cores that are to be driven to a partially switched (binary 1) state are so driven by a single driver and an X selection switch which activates selected column conductors sequentially. Switch 13 of FIG. 1 may be assumed to include circuitry useful for this purpose if such operation is desired. Similarly, interrogation may be carried out sequentially also permitting the use of a single sense amplifier rather than one for each column as is customary in 2D organizations.

Operation may be improved further by the use of a reset pulse following each read pulse to provide the recovery of some irreversible flux switching.

The following table indicates various modes of operation in accordance with this invention and the resulting output ratios between binary ones and zeros obtained using a commercially available ferrite memory core in accordane with this invention. It is clear that the largest ratios, and thus the greatest margins, are achieved when both sharp pulses and reset pulses are used.

| Sharp pulses used | Reset pulses used | Ratio measured |
|---|---|---|
| No | No | 1.42/1 |
| Yes | No | 1.75/1 |
| No | Yes | 1.64/1 |
| Yes | Yes | 1.83/1 |

Differences in detailed ratios are obtained when differently processed and different ferrites are used. Even higher ratios may be attainable for memory cores processed and selected with the intention of optimizing this mode of NDRO operation. Furthermore, the operational ratios may be increased substantially through differential sensing of outputs with respect to the output of a reference core that is maintained in the remanent or zero flux state.

What has been described is considered only illustrative of the principles of this invention. Therefore, other and varied modifications may be made therein by one skilled in the art without departing from the spirit and scope of this invention.

What is claimed is:

1. A magnetic memory including a plurality of magnetic cores each having a first remanent state and a second partially switched state characterized by a first permeability condition, said cores being organized in rows and columns, first means for driving all the cores of a selected row to said first remanent states, second means for driving selected cores of a selected row of cores to said second partially switched states, and third means for driving the partially switched cores of said selected row of cores to a second permeability condition higher than said first permeability condition.

2. A magnetic memory in accordance with claim 1 wherein said first means comprises drive means including row conductors coupled to the cores of associated rows and means for applying selectively to said row conductors pulses of an amplitude and first polarity to drive each core coupled thereto to said first remanent state.

3. A magnetic memory in accordance with claim 2 wherein said second means comprises drive means including column conductors coupled to the cores of associated columns and said row conductors, and means for applying coincident half-select pulses to coordinate pairs of said column and row conductors.

4. A magnetic memory in accordance with claim 3 wherein said third means includes drive means for applying selectively to said row conductors a pulse of an amplitude and duration and of said first polarity to drive said partially switched cores to said second permeability condition.

5. A magnetic memory in accordance with claim 4 also including means for applying an interrogate pulse to said row conductors selectively, and means for detecting the presence and absence of said second high permeability conditions in cores coupled to the selected row conductor.

6. A magnetic memory in accordance with claim 3 including means for detecting sequentially the presence and absence of said second high permeability conditions in cores coupled to the selected row conductor.

7. A magnetic memory in accordance with claim 6 wherein said second means includes means for driving said column conductors sequentially.

References Cited

UNITED STATES PATENTS 3,278,916 10/1966 Kiseda et al. -------- 340—174

JAMES W. MOFFITT, Primary Examiner